United States Patent
Yang

(10) Patent No.: US 6,557,721 B2
(45) Date of Patent: May 6, 2003

(54) INTEGRAL SOFT AND HARD PLASTIC NOZZLE

(75) Inventor: Shih-Sheng Yang, Taipei (TW)

(73) Assignee: Universal Trim Supply Co., Ltd., Taipei Hsien (TW)

( * ) Notice: Subject to any disclaimer, the term of this patent is extended or adjusted under 35 U.S.C. 154(b) by 58 days.

(21) Appl. No.: 09/963,506

(22) Filed: Sep. 27, 2001

(65) Prior Publication Data

US 2002/0166990 A1 Nov. 14, 2002

(30) Foreign Application Priority Data

May 11, 2001 (TW) ..................................... 90207693 U

(51) Int. Cl.[7] ............................................. B67D 5/64
(52) U.S. Cl. ..................... 220/713; 220/714; 222/490
(58) Field of Search ................................. 222/175, 490; 220/714, 713, 703

(56) References Cited

U.S. PATENT DOCUMENTS 5,601,207 A * 2/1997 Paczonay .................... 220/703
5,645,404 A * 7/1997 Zelenak ......................... 417/1
5,730,336 A * 3/1998 Lerner ......................... 222/490
5,791,510 A * 8/1998 Paczonay .................... 220/714
6,032,831 A * 3/2000 Gardner et al. ............. 222/175
6,070,767 A * 6/2000 Gardner et al. ............. 222/175

* cited by examiner

Primary Examiner—Joseph M. Moy
(74) Attorney, Agent, or Firm—Leong C. Lei

(57) ABSTRACT

A hard and soft plastic integral nozzle structure includes a built-in supporting frame member which is made of hard plastic, and at least having a left and a right clipping rod such that both the left clipping rod and the right clipping rod of the frame member in the injected mold being propped by a propping member to open outward, and forms an integrally wrapped nozzle. After the propping member in the mold retracts and separates from the mold, the contraction of the elasticity for the two clipping rods of the supporting frame member made of hard plastic material gives an excellent anti-leaking effect for the crevices at the center of the nozzle.

2 Claims, 4 Drawing Sheets

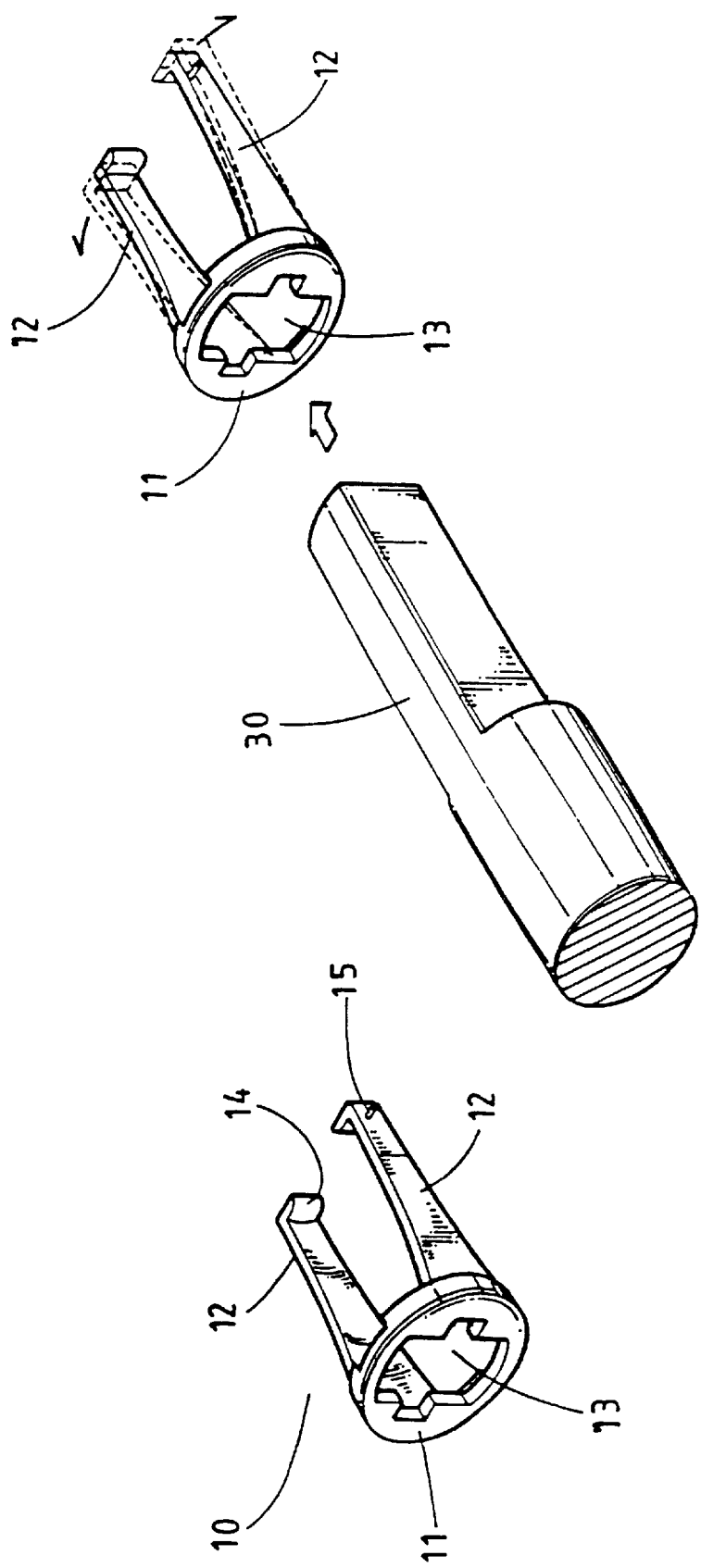

INTEGRAL SOFT AND HARD PLASTIC NOZZLE

BACKGROUND OF THE INVENTION (a) Field of the Invention

The present invention relates to a nozzle structure.

(b) Description of the Prior Art

As the outdoors exercises such as jogging, mountain climbing, or bicycling, it needs to replenish water to human body after lots of sweating after the exercise. Therefore, the regular athletes generally have a special outdoor exercise water bag that contain water or drink for supplying drinking water to the athletes.

The special water bag for outdoor exercises uses the connection pipe to guide water for sucking, therefore it has a nozzle structure on the water bag. The traditional water bags are divided into soft type and hard type. The soft nozzle structure is disclosed in the U.S. Pat. Nos. 5,601,207, 5,730,336, 5,791,510, 6,032,831, and 6,070,767. The external appearance of the nozzle is similar to a nipple of a baby's bottle, which is made by injection of soft plastic material such as eatable PU plastic or silica gel. The front end of the sucking nozzle has a plat or cross water outlet crevice, and the tiny outlet crevice normally has a natural resuming elasticity being squeezed around the periphery of the plastic board so that it attains the anti-leaking effect.

When using, the soft nozzle is held in the mouth and pressed by the clench of the teeth and lips such that the water outlet crevice is in open status. Working together with the suction by the mouth, it attains the drinking function.

However, although the soft nozzle of this type makes the sucking easier and does not require much effort, yet its shortcoming relies on the storage on the backpack and water will leak easily due to accidental squeezing.

In addition, the hard nozzle structure such as that disclosed in U.S. Pat. No. 5,699,933 which places the nozzle into the clogging member and spring to automatically block the water stream and passage. Due to the protrusion of the compressible covering member is clenched by the teeth and pushes the clogging member along the inclined plane to attain the function of retracting the water.

To make it easier for our examiner to understand the objective of the invention, structure, innovative features, and performance, we use a preferred embodiment together with the attached drawings for the detailed description of the invention.

This type of hard nozzle that can effectively control the water discharge requires a much larger force on the compressible covering member and additional suction of the mouth when exerting force at the compressible covering member by the teeth, and the operating skills naturally is much stricter and not easy to use.

Therefore, the present invention tends to have a design with soft exterior together with a hard inner frame such that it provides good texture and a better anti-leaking effect and thus the inventor invented the present invention.

In view of the shortcomings and inconvenience of the prior art mentioned above, which are the subjects of improvements for a long time, hence the inventor of the present invention based on years of experience accumulated from the engagement in the related industry conducted extensive research to resolve the foregoing shortcomings and invented the present invention.

The primary objective of the present invention is to provide a nozzle having a soft comfortable feeling for holding it in the mouth, and in the meantime to enhance the anti-leaking effect of a soft nozzle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 shows the external look of the nozzle of the built-in supporting frame member according to the present invention.

FIG. 3 is a schematic diagram showing the insertion of a propping mold on the mold when the integral formation injects and combines the soft plastic material.

DESCRIPTION OF THE PREFERRED EMBODIMENT

Figure 1:
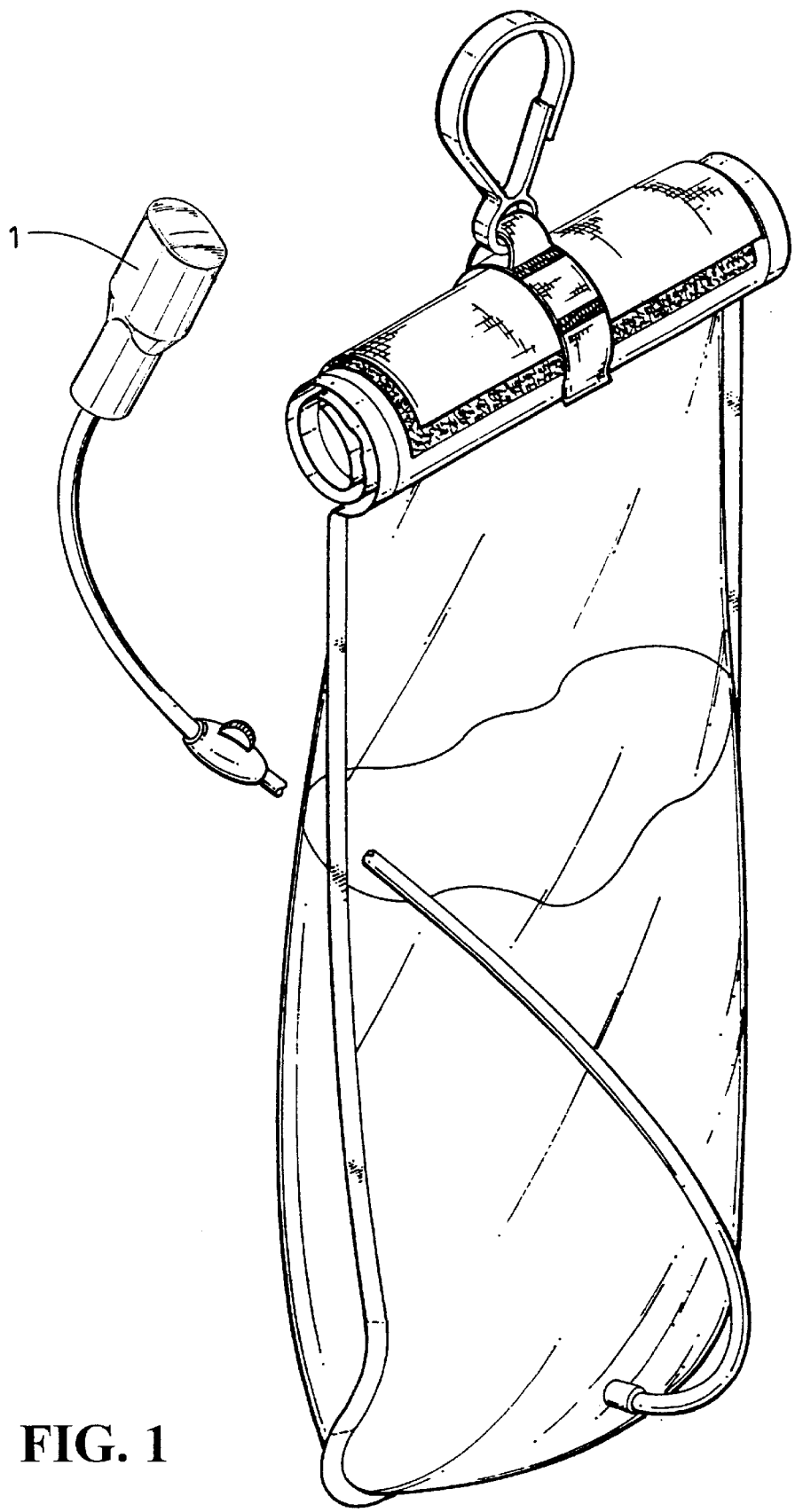
FIG. 1 is a schematic diagram showing the application of the nozzle of the water bag according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Please refer to FIG. 1, which shows the designed structure of a nozzle 1 applicable for being fixed onto a water bag for the bicycle for outdoors exercise activities, and used as a straw or guiding pipe when the user carries it in a backpack. By means of the sucking on the nozzle, the user can drink the water in the water bag.

Figure 7:
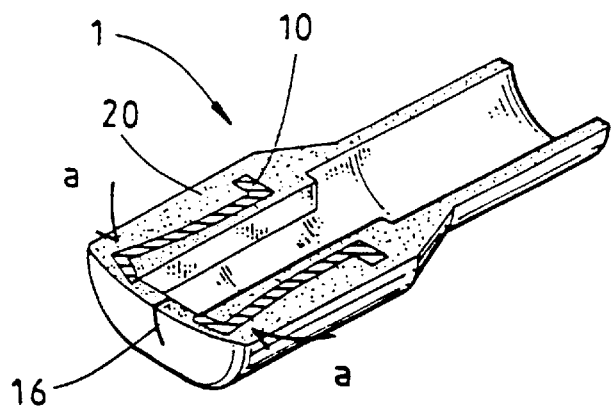
FIG. 7 is a cross-sectional diagram showing the anti-leaking effect for the outlet crevices that is cut in the middle of the front end of the nozzle according to the present invention.

In FIGS. 2, 3, and 7, the structure of the nozzle 1 according to the present invention comprises a hard plastic supporting frame member 10 being wrapped by a soft leather layer of a soft plastic material.

Figure 4:
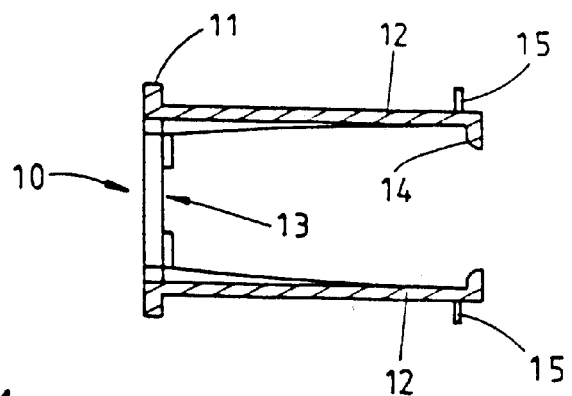
FIG. 4 is a cross-sectional view of the supporting frame member according to the present invention.

Please refer to FIG. 4, the supporting frame member 10 is made by the injection of hard plastic material, and the exterior comprises a complete frame 11 and two symmetrical clipping rods 12, and a penetrating hole 13 being disposed at the center of the frame. The extended ends of the clipping rod 12 has a inwardly bent inclined pressing section 14, and a positioning pillar 15 being protruded from the external side of each clipping rod.

Figure 5:
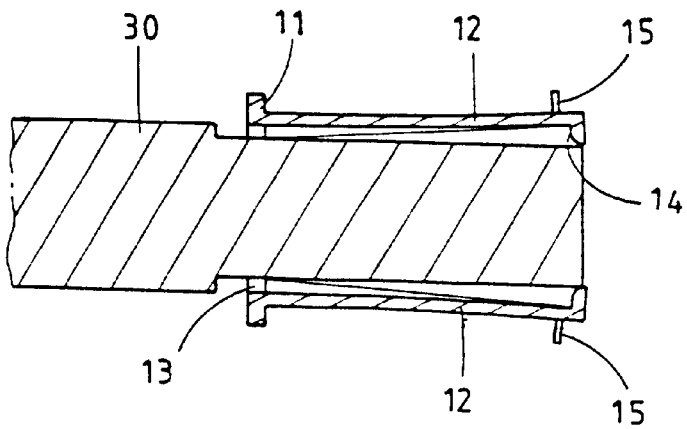
FIG. 5 is a cross-sectional diagram of the present invention after the propping mold is inserted into the supporting frame as shown in FIG. 3 of the present invention.
Figure 6:
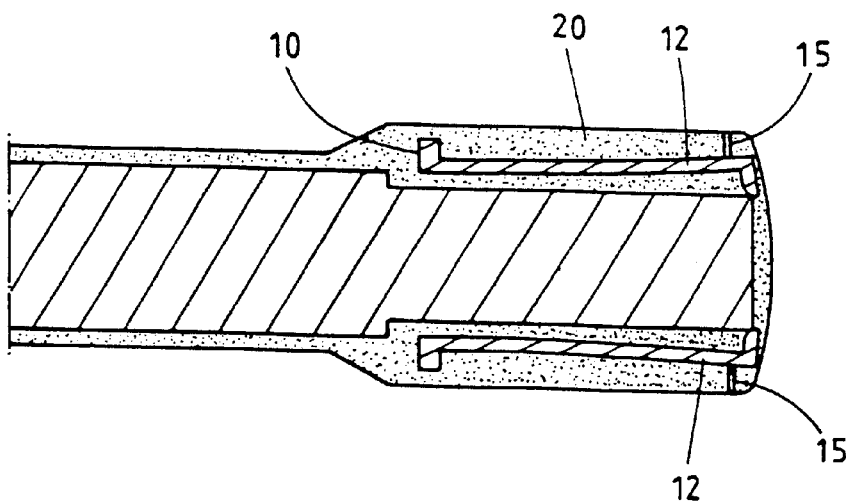
FIG. 6 is a cross-sectional diagram showing the covering injected soft plastic material in a supporting frame that is integrally formed and combined.

Please refer to FIG. 5, when the supporting frame member 10 is placed in the mold, the positioning pillar 15 disposed on the outer side of the clipping rod acts as the positioning of the mold, and a propping mold 30 in the mold can extend or retract and insert into the penetrating hole 13 such that the board press against the inclined pressing section 14 of the clipping rod 12. Due to the two clipping rods 12 are squeezed to open at a tiny angle. In FIG. 6, after the propping mold 30 props and opens the two clipping rods 12, the soft plastic material is injected into the mold so that the exterior of the supporting frame member is completely wrapped by the soft plastic materials. It forms a soft leather layer 20 to fit the mouth contact during sucking.

Figure 8:
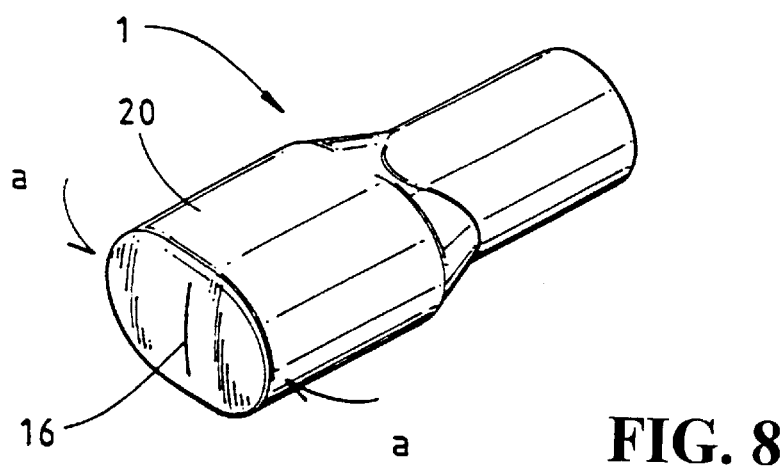
FIG. 8 shows the external look of the nozzle according to the present invention.

After removing the propping mold 30, the two hard plastic clipping rods 12 are squeezed to open. When the propping mold 30 is removed, it naturally forms a resuming status and retracts the clipping stress a (as shown in FIGS. 7 and 8). The elasticity coefficient of the soft plastic leather layer 20 wrapped around the periphery is smaller than the retracted clipping stress a of the foregoing clipping rod, so that it forms an excellent clipping force, which naturally provides an excellent anti-leaking effect when the water outlet crevice at the center of the front section of the nozzle 1 is closed.

Figure 9:
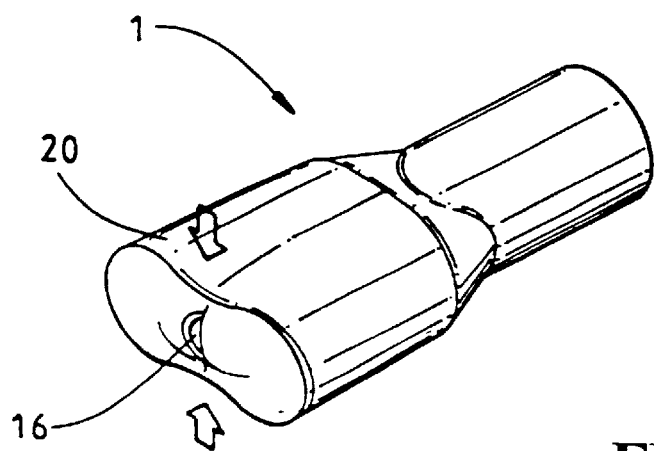
FIG. 9 shows the external look of the nozzle according to the present invention when it is squeezed to discharge water.

In FIG. 9, when the user holds the nozzle 1 by the mouth, the user can bite the soft leather layer 20 of the nozzle by an appropriate force exerted by the upper and lower jaws. The nozzle according to the present invention has a layer of soft plastic material each on the upper and the lower side of the nozzle 1, therefore, when the soft leather layer 20 is bitten, the user enjoys the comfort of sucking the drinking water the same way as that of the soft nozzle. When the biting force is released, the left and right sides of the clipping rods will automatically clip to close the water outlet crevice 16 in the middle in order to attain a definite anti-leaking effect which is much better than that for the traditional soft nozzle.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An integral soft and hard plastic nozzle structure, comprising:

a supporting frame, made by injection of hard plastic material, at least having a complete frame and two clipping rods, and a penetrating hole being disposed at the center of the frame, and the two clipping rods having a bent inclined pressing section on each end of the clipping rod;

a soft leather layer, made of hard plastic material, wrapping the supporting frame to form the supporting frame by injection, and a water outlet crevice being disposed in the middle of the front end of the supporting frame;

by means of the supporting frame being placed in the mold, and a propping mold passing through a penetrating hole at the center of the supporting frame, such that the propping mold props again the inclined pressing section at the end of the clipping rod and the clipping rod being squeezed to open up in a tiny angle and forms by injection an integral wrapped supporting frame having the soft leather layer on its exterior.

2. An integral soft and hard plastic nozzle structure as claimed in claim 1, wherein said supporting frame having a positioning pillar protruded from the outer side of the clipping rod.

* * * * *